United States Patent
Zhou

(10) Patent No.: US 7,203,373 B2
(45) Date of Patent: Apr. 10, 2007

(54) IMAGE AND VIDEO CODING WITH REDUNDANT RUN-LENGTH-LEVEL-LAST CODEWORDS REMOVED

(75) Inventor: Minhua Zhou, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 669 days.

(21) Appl. No.: 10/283,452

(22) Filed: Oct. 30, 2002

(65) Prior Publication Data

US 2003/0128885 A1    Jul. 10, 2003

Related U.S. Application Data

(60) Provisional application No. 60/335,700, filed on Oct. 30, 2001.

(51) Int. Cl.
*G06K 9/36* (2006.01)
*G06K 9/46* (2006.01)

(52) U.S. Cl. ..................................................... 382/245

(58) Field of Classification Search ................. 382/245
See application file for complete search history.

(56) References Cited

U.S. PATENT DOCUMENTS

| 4,618,846 | A | * | 10/1986 | Ross et al. | 382/245 |
| 5,587,798 | A | * | 12/1996 | Kurita et al. | 382/245 |
| 5,751,232 | A | * | 5/1998 | Inoue et al. | 341/63 |
| 5,764,357 | A | * | 6/1998 | Dockser | 382/246 |
| 5,812,701 | A | * | 9/1998 | Chen | 382/246 |
| 5,940,540 | A | * | 8/1999 | Cornelissen | 382/245 |
| 2003/0151529 | A1 | * | 8/2003 | Karczewicz | 341/51 |

* cited by examiner

*Primary Examiner*—Bhavesh M Mehta
*Assistant Examiner*—Yuzhen Ge
(74) *Attorney, Agent, or Firm*—Carlton H. Hoel; W. James Brady; Frederick J. Telecky, Jr.

(57) ABSTRACT

A method of run-length encoding for known block size, such as image/video compression with block transform, such as DCT, with end of block indication suppressed when the end of the block can be inferred from the prior coding symbols.

2 Claims, 2 Drawing Sheets

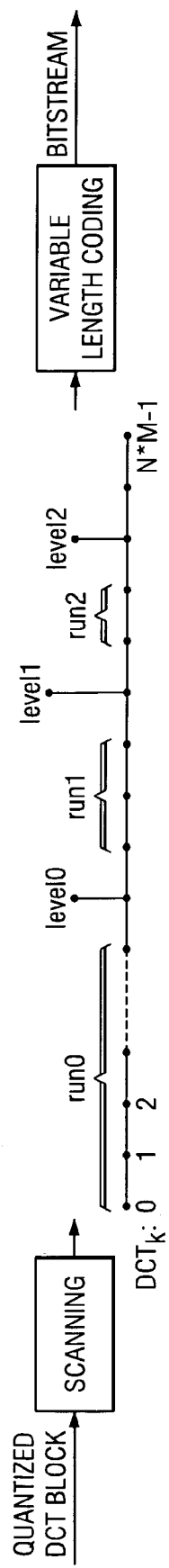
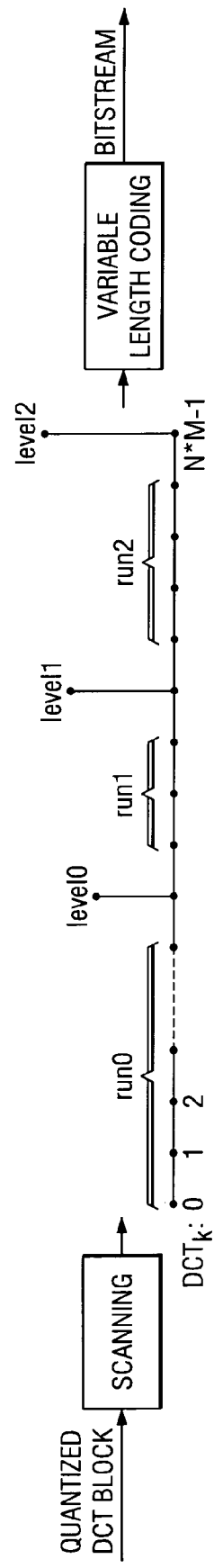
FIG. 4a
FIG. 4b

IMAGE AND VIDEO CODING WITH REDUNDANT RUN-LENGTH-LEVEL-LAST CODEWORDS REMOVED

CROSS REFERENCE TO RELATED APPLICATIONS

This application claims priority from provisional application Ser. No. 60/335,700, filed Oct. 30, 2001.

BACKGROUND OF THE INVENTION

This invention relates to coding methods, and more particularly to run length coding as is useful with block transforms, such as DCT, plus variable length coding and related systems.

Many methods exist to compress images/video, such as JPEG for still images and H.26x/MPEGs for video sequences. In DCT-based video compression, such as H.261, H.263, MPEG1, MPEG2, and MPEG4, or image compression, such as JPEG, a picture is decomposed into macroblocks. Each macroblock contains a certain number of 8×8 blocks, depending upon the chroma-format used. For example, in the case of 4:2:0 chroma-format a macroblock is made up of four 8×8 luminance blocks (i.e., 16×16 pixels) and two 8×8 chrominance blocks (each located as a sub-sampling of the 16×16). FIG. 3 depicts the block diagram of DCT-based video encoding. In order to reduce the bit-rate, 8×8 DCT (discrete cosine transform) is used to convert the blocks into the frequency domain for quantization. The first coefficient (0 frequency) in an 8×8 DCT block is called the DC coefficient; the remaining 63 DCT-coefficients in the block are called AC coefficients. The DCT-coefficients blocks are quantized, scanned into a 1-D sequence, and coded by using variable length coding (VLC). For motion compensation (MC) which uses motion estimation (ME) of successive video frames, inverse-quantization and IDCT are needed for the feedback loop. Except for MC, all the function blocks in FIG. 3 operate on 8×8 block basis.

H.26L is a new video compression video standard being developed by ITU-T which offers much higher coding efficiency (about 30–50% additional bit-rate reduction at the same coding qualities) than MPEG-4 SP. A typical application of H.26L could be wireless video on demand, in which the bandwidth is so limited that a coding standard of high compression ratio is strongly desired.

The basic coding techniques in H.26L are still motion compensated prediction, transform, quantization and entropy coding as illustrated in FIG. 3. However, H.26L differs from MPEG4/H.263 in many details. One of major differences lies in the transform and quantization. Instead of 8×8 DCT transforms, H.26L may use a 4×4 integer transform for the residual coding of the residual blocks generated either by using motion compensation for inter-coded macroblocks or by using intra prediction for intra-coded macroblocks.

The transform coefficient encoding, illustrated as operation VLC in FIG. 3, encodes a scan-order sequence of transform coefficients of a block by first run-length encoding and then entropy encoding the run-length coding symbols into variable length codewords according to a frequency of occurrence (a lookup table). In particular, MPEG1, MPEG2, and H.26L first encode the scanned quantized DCT transform coefficient sequence, $DCT_0, DCT_1, \ldots, DCT_{63}$, as a sequence of run-length coding symbols, (run1, level1), (run2, level2), ..., (runN, levelN), EOB, where run1 is the number of initial $DCT_j$s equal to zero, level1 is the value of the first non-zero $DCT_j$, run2 is the number of $DCT_j$s equal to zero between the first non-zero $DCT_j$ and the second non-zero $DCT_j$, level2 is the value of the second non-zero $DCT_j$, and so forth; and EOB is a coding symbol indicating no more nonzero coefficients and thus no more coding symbols. Then the coding symbols are assigned variable length codewords according to a lookup table. This is called a 2-D coding because of the coding symbols include pairings (runk, levelk).

Analogously, MPEG4 and H.263 use 3-D coding symbols, (runk, levelk, lastk), where again runk is the number of $DCT_j$s equal to zero following the $(k-1)^{th}$ non-zero $DCT_j$, levelk is the value of the kth nonzero $DCT_j$, and lastk=0 if there are more nonzero $DCT_j$s, whereas lastk=1 if this is the last nonzero $DCT_j$ and thus the last 3-D symbol generated by $DCT_0, DCT_1, \ldots, DCT_{63}$. The 3-D symbols do not need an EOB coding symbols due to the lastk indicator in each coding symbol. Again, variable length codewords are assigned to the possible coding symbols; and, in particular, two separate codewords are needed for (runk, levelk, lastk=0) and (runk, levelk, lastk=1). Because lastk=0 is more common than lastk=1, the lookup tables typically have shorter codewords for (runk, levelk, lastk=0) than for (runk, levelk, lastk=1).

In some cases, however, these runl-length codings contain redundancy.

SUMMARY OF THE INVENTION

The invention provides a run-length coding with an end of block/sequence symbol redundancy removed.

This has advantages including reduction in the coding bit requirements.

BRIEF DESCRIPTION OF THE DRAWINGS

The drawings are heuristic for clarity.

FIG. 4 shows an example.

DESCRIPTION OF THE PREFERRED EMBODIMENTS

1. Overview

Figure 1:
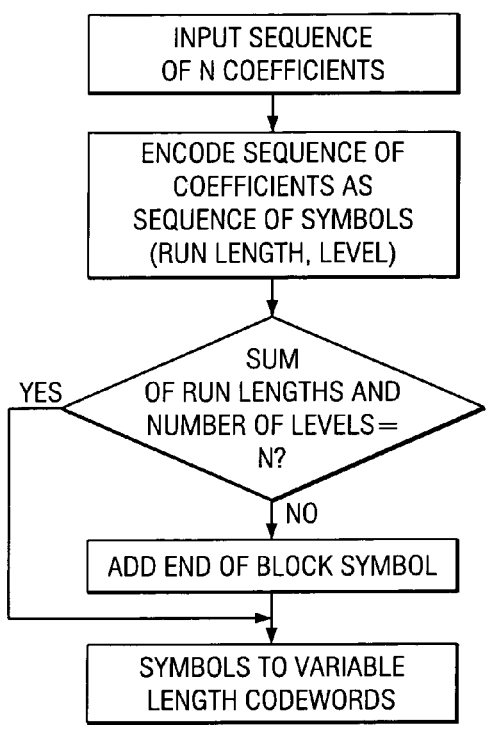
FIGS. 1–2 are flow diagrams of preferred embodiment methods.
Figure 2:
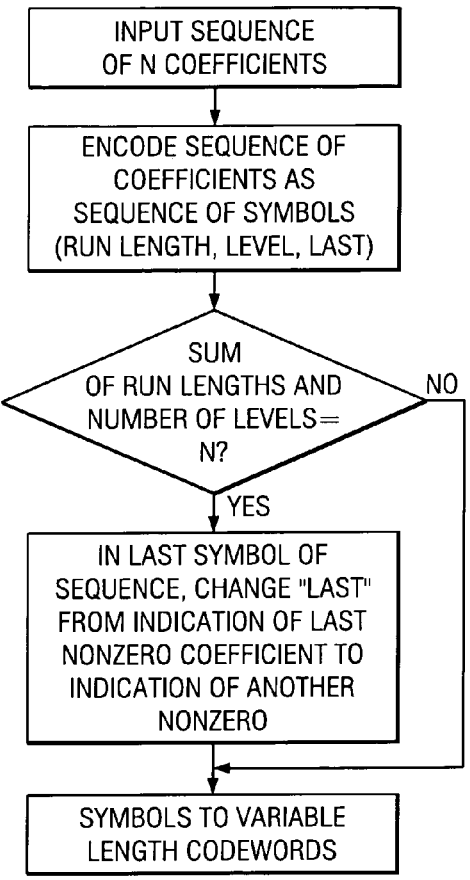
Figure 3:
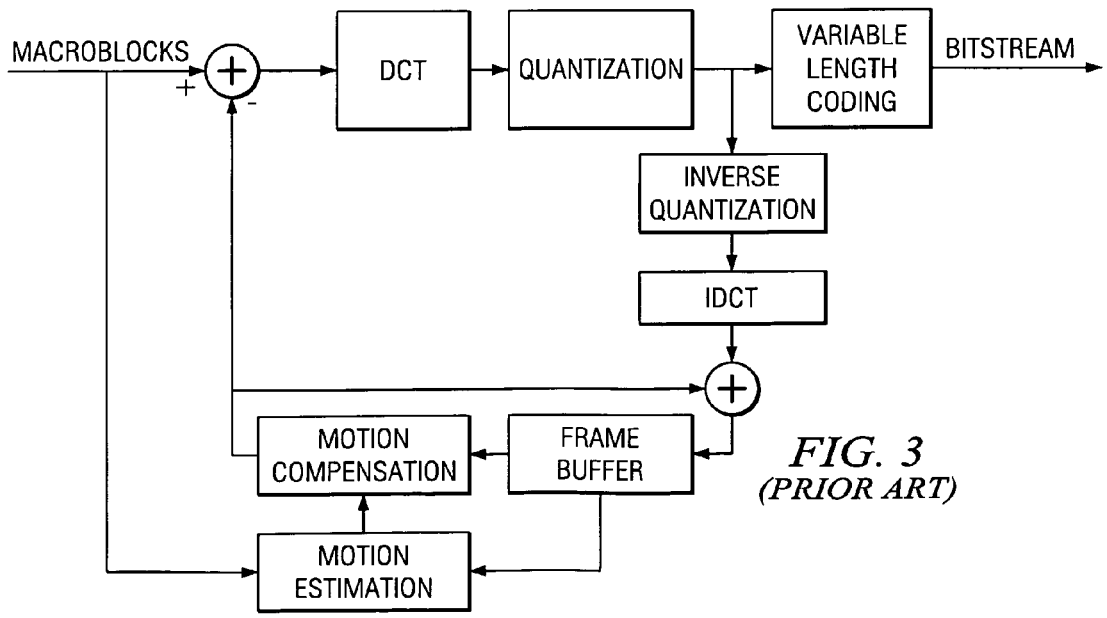
FIG. 3 illustrates motion compensated video compression.

The preferred embodiment run-length coding methods for a known sequence length modify the end-of-sequence indicator when the end of sequence can be inferred from the prior run-length symbols. For image/video compression/decompression methods which apply DCT (and quantization) on 8×8 blocks, there are 64 scanned coefficients to be run-length encoded; and thus when the number of 0s plus the number of non-zero coefficients reaches 64, the end of the block is known and an end of block (EOB) indicator is redundant. Thus the preferred embodiment methods have a decision during encoding which omits any redundant end of block indicator. Analogously, during decoding the number of coefficients per block is tracked and end of block inferences made. FIGS. 1–2 show flow diagrams for the 2-D and 3-D coding symbol preferred embodiments.

The functions can be performed with digital signal processors (DSPs) or general purpose programmable processors or application specific circuitry (specialized accelerators) alone or as part of a system on a chip such as both a DSP and RISC processor plus accelerator(s) on the same chip with the RISC processor as controller. These chip(s) could include transmission and reception functions for wireless connections as for cellular phones and portable computers. The functions could be a stored program in an onboard or external ROM, flash EEPROM, or ferroelectric RAM for any programmable processors. For video the preferred embodiment methods apply to both macroblocks of Intra-coded frames (i.e. I frames and still images) and of non-Intra frames (Predictive or Bidirectional frames, i.e. P or B frames, respectively) which use run-length coding with variable-length codewords.

2. 2-D Run-length Symbol Preferred Embodiments

FIG. 1 is a flow diagram for a first preferred embodiment method for 2-D coding symbols. In general, a length-N sequence, $x_1, x_2, \ldots, x_N$, of values, typically with many of the values equal to 0, is run-length encoded by 2-D coding symbols (run1, level1), (run2, level2), ..., (runK, levelK), EOB as follows. First, if $x_1$ is nonzero, then run1=0 and level1=$x_1$; otherwise, run1 is the number of initial $x_j$s equal to 0 and level1 equals the first nonzero $x_j$; that is, $x_1=x_2=\ldots=x_{run1}=0$ and level1=$x_{run1+1}$. Similarly, if $x_{run1+2}$ is nonzero, then run2=0 and level2 equals $x_{run1+2}$; otherwise run2 is the number of zero-valued $x_j$s following $x_{run1+1}$ and level1 equals the first following nonzero $x_j$; that is, $x_{run1+2}=x_{run1+3}=\ldots=x_{run1+1+run2}=0$ and level2=$x_{run1+1+run2+1}$. This continues until all nonzero $x_j$s are included. In particular, if $x_N$ (the last element of the sequence) is zero and $x_{N-m}$ is the last nonzero element for some positive integer m, then the next-to-last 2-D coding symbol (runK, levelK) will have levelK=$x_{N-m}$ and the sum run1+run2+...+runK+K=N−m. Then the last 2-D symbol EOB will indicate that $x_{N-m+1}=x_{N-m+2}=\ldots=x_N=0$.

However, if $x_N$ is nonzero, then the next-to-last symbol (runK, levelK) will have levelk=$x_N$ and the sum run1+run2+...+runK+K=N, and thus a decoder can already determine that the end of the sequence has been reached because of the sum to N. In this case the last 2-D symbol EOB will be redundant. Consequently, the preferred embodiment method of encoding checks whether the last element of the input sequence, $x_N$, is nonzero, and if it is nonzero, the method omits the EOB coding symbol.

The preferred embodiment method of decoding of the preferred embodiment encoded sequence of 2-D symbols includes the following. When decoding the symbol (runk, levelk), the method increments the sum (from previously decoded symbols) run1+run2+...+run(k−1)+(k−1) by runk+1, and if the sum reaches N prior to receipt of an EOB symbol, then the method presumes no EOB symbol will appear and the sequence of symbols has been fully decoded.

3. 3-D Run-length Symbol Preferred Embodiments

FIG. 2 is a flow diagram for a first preferred embodiment method for 3-D coding symbols. In general, a length-N sequence, $x_1, x_2, \ldots, x_N$, of values, typically with many of the values equal to 0, is run-length encoded by 3-D coding symbols (run1, level1, last1), (run2, level2, last2), ..., (runk, levelK, lastK) as follows. First, if $x_1$ is nonzero, then run1=0, level1=$x_1$ and last1=0; otherwise, run1 is the number of initial $x_j$s equal to 0 and level1 equals the first nonzero $x_j$; that is, $x_1=x_2=\ldots=x_{run1}=0$ and level1=$x_{run1+1}$. And last1=0 if there is another (second) nonzero $x_j$ and last1=1 if $x_{run1+1}$ is the only nonzero element. Similarly, if $x_{run1+2}$ is nonzero, then run2=0 and level2 equals $x_{run1+2}$; otherwise run2 is the number of zero-valued $x_j$s following $x_{run1+1}$, and level1 equals the first following nonzero $x_j$; that is, $x_{run1+2}=x_{run1+3}=\ldots=x_{run1+1+run2}=0$ and level2= $x_{run1+1+run2+1}$. Again, last2=0 if there is another (third) nonzero $x_j$ and last2=1 if $x_{run1+1}$ and $x_{run1+1+run2+1}$ are the only two nonzero elements. This repeats until all $x_j$s are included. In particular, if $x_N$ (the last element of the sequence) is zero and $x_{N-m}$ is the last nonzero element for some positive integer m, then the last 3-D coding symbol (runK, levelK, lastK) will have levelK=$x_{N-m}$, the sum run1+run2+...+runK+K=N−m, and lastK=1 to indicate no more symbols and that $x_{N-m+1}=x_{N-m+2}=\ldots=x_N=0$. In effect lastk is a flag for indication of last nonzero coefficient and thus last coding symbol.

However, if $x_N$ is nonzero, then the last symbol (runK, levelK, lastK) will have levelk=$x_N$ and the sum run1+run2+...+runK+K=N, and thus a decoder can already determine that the end of the sequence has been reached because of the sum to N. In this case the lastK=1 will be redundant and lastK=0 is used instead which will allow use of a shorter codeword. Consequently, the preferred embodiment method of encoding checks whether the last element of the input sequence, $x_K$, is nonzero, and if it is nonzero, the method omits the end of sequence indicator in the last coding symbol.

The preferred embodiment method of decoding of the preferred embodiment encoded sequence of 3-D symbols includes the following. When decoding the symbol (runk, levelk, lastk), the method increments the sum (from previously decoded symbols) run1+run2+...+run(k−1)+(k−1) by runk+1, and if the sum reaches N prior to receipt of a symbol with last=1, then the method presumes no further symbols will appear and the sequence of symbols has been fully decoded.

4. Example

As an explicit example of the preferred embodiments with slightly different notation, FIG. 4 illustrates a quantized DCT-block (size N*M) scanned into a 1-D sequence with index from 0 to N*M−1. There are three non-zero coefficients, so the input coding signal to the variable length encoder written in 2-D symbol form is:

(run0, level0), (run1, level1), (run2, level2), EOB

While the same input written in 3-D symbol form is:

(run0, level0, 0), (run1, level1, 0), (run2, level2, 1)

Each coding symbol, including EOB, is assigned a codeword according to a particular coding standard, and is encoded into the output bitstream. In the current video standards, an EOB (or LAST=1 symbol in 3-D representation) is always appended after encoding DCT-coefficients of a block, regardless of whether the last coefficient of the block (index N*M−1 in FIG. 4) is zero or non-zero. Case (b) in FIG. 4 illustrates a case in which the last non-zero coefficient is the last coefficient in the block, it has the same input signal form as case (a) according to the current run-length coding scheme, that is:

(run0, level0), (run1, level1), (run2, level2), EOB or (run0, level0, 0), (run1, level1, 0), (run2, level2, 1)

However, in case (b) the EOB or (LAST=1 code) is redundant. Since the block size is known, the decoder automatically detects that the whole block is decoded if the currently decoded non-zero coeffciient is the (N*M−1)th (last) coefficient of the block (the coefficient index of a block cannot go beyond N*M−1). Therefore, in case (b) a more efficient coding should remove EOB from the VLC input signal, using:

(run0, level0), (run1, level1), (run2, level2) (2-D symbol representation)

or (run0, level0, 0), (run1, level1, 0), (run2, level2, 0) (3-D symbol representation)

Removal of EOB in this case would save bit-rate. The number of bits used for encoding EOB varies. In MPEG-1, EOB is represented by 2 bits, while it is either 2 or 4 bits in MPEG-2, but H.26L only uses one bit to represent EOB. In the 3-D case (run, level, 0) has shorter codeword than (run, level, 1). Therefore, bit-rate is saved as well.

4. Modifications

The preferred embodiments can be varied while maintaining the features of inferring end of block in a sequence of run-length coding symbols which may omit an explicit end-of-sequence indicator.

For example, wavelet, integer, and other transform methods could be used in place of DCT with analogous coefficient quantization and run-length plus variable length encoding and decoding.

What is claimed is:

1. A method of run-length encoding, comprising:
   (a) providing a sequence of N coefficients where N is a positive integer;
   (b) converting said sequence of N coefficients into a sequence of run-length symbols $Z_1, Z_2, \ldots, Z_K$ where K is a positive integer, each of said symbols $Z_k$ for k=1, 2, . . . , K consists of a run length, a level, and a last-symbol flag;
   (c) wherein said run-length symbol $Z_K$ excludes an indication that $Z_K$ is the last symbol of the sequence of run-length symbols of step (b) when said run-length symbols $Z_1, Z_2, \ldots, Z_K$ have run-lengths and coefficient values which define N coefficients.

2. A method of run-length decoding, comprising:
   (a) receiving a sequence of symbols $Z_1, Z_2, \ldots, Z_K$, where K is a positive integer, said symbols $Z_1, Z_2, \ldots, Z_K$ corresponding to a block of N coefficients, where N is a positive integer; and
   (b) when each of said symbols $Z_k$ for k=1, 2, . . . , K−1 consists of a run length, a level, and a last-symbol flag and when said symbols $Z_1, Z_2, \ldots, Z_K$ have run-lengths and coefficient values which define N coefficients, interpreting said sequence of symbols $Z_1, Z_2, \ldots, Z_K$ as an encoding of said block of N coefficients excluding the use of an indication that $Z_K$ is the last symbol of the sequence.

* * * * *